United States Patent [19]

Iga

[11] Patent Number: 5,600,446
[45] Date of Patent: Feb. 4, 1997

[54] ELECTRONIC CAMERA APPARATUS FOR INSTANT AND CONVENTIONAL PHOTOGRAPHY, AND VIDEO CAMERAS

[76] Inventor: Adam S. Iga, 1324 S. Dinwiddie St., Arlington, Va. 22206

[21] Appl. No.: 407,394

[22] Filed: Mar. 17, 1995

Related U.S. Application Data

[63] Continuation of Ser. No. 31,839, Mar. 16, 1993, abandoned.

[51] Int. Cl.⁶ .............................. H04N 9/79; H04N 5/84
[52] U.S. Cl. ......................................................... 386/117
[58] Field of Search ...................... 358/332, 335, 358/310, 345, 347, 906, 342; 348/222, 207, 333, 615, 576, 584, 588

[56] References Cited

U.S. PATENT DOCUMENTS

| | | |
|---|---|---|
| 4,456,352 | 6/1984 | Sato . |
| 4,546,390 | 10/1985 | Konishi et al. ................ 360/10.3 |
| 4,553,164 | 11/1985 | Labb ............................. 348/615 |
| 4,638,365 | 1/1987 | Kato . |
| 4,660,098 | 4/1987 | Wolcott ......................... 358/332 |
| 4,780,756 | 10/1988 | Shiota et al. .................. 358/78 |
| 4,794,460 | 12/1988 | Shiota .......................... 358/244 |
| 4,814,888 | 3/1989 | Inoue et al. ................... 348/207 |
| 4,901,096 | 2/1990 | Lemelson . |
| 5,018,017 | 5/1991 | Sasaki et al. ................. 358/209 |
| 5,053,879 | 10/1991 | Kubota ......................... 358/244 |
| 5,134,487 | 7/1992 | Taguchi et al. ............... 358/909.1 |

OTHER PUBLICATIONS

Computer Organization, Third Edition, by V. C. Hamacher, Z. C. Vranesic, and S. G. Zaky, 1990 Edition pp. 359 through 361.

*Primary Examiner*—Thai Q. Tran
*Assistant Examiner*—Robert Chevalier

[57] ABSTRACT

A camera apparatus for recording improved hard-copy of a video image includes a signal processing circuit for correcting the characteristics of the CCD to conform to the characteristics of the photosensitive material, a light beam generating and focusing circuit for exposing the photosensitive material to the image, and, a display processor for directing and controlling the focusing of the light beam(s).

2 Claims, 4 Drawing Sheets

ELECTRONIC CAMERA APPARATUS FOR INSTANT AND CONVENTIONAL PHOTOGRAPHY, AND VIDEO CAMERAS

This application is a continuation of application Ser. No. 08/031,839, filed Mar. 16, 1993, now abandoned. The FWC application filed Mar. 17, 1995 and given patent application Ser. No. 08/407,394.

FIELD OF THE INVENTION

This invention relates to a video camera apparatus which uses the video signals it generates from taking a picture frame of an object, to control a light imaging device to make a hard-copy image of the object onto photosensitive material.

DESCRIPTION OF THE PRIOR ART

Various apparatus and methods of producing a hard-copy image of an object whose picture is taken by an electronic still camera or a television camera have been suggested. One such apparatus and method is fully described in U.S. Pat. No. 4,780,756. In this patent, the video signal representing the picture frame whose hard-copy is sought is passed through various components and is finally entered into a CRT (Cathode Ray Tube), where it makes the picture. The light from the picture on the CRT is then focused by a lens onto a photosensitive material where the hard-copy is made.

In U.S. Pat. No. 5,053,879, a CRT, again used to display the image data, is exposed to photographic paper onto which light from the image on the CRT is focused and a hard-copy is made.

However, these known CRT based methods of producing a hard-copy image of an object on photosensitive paper have distinct shortfalls. One such shortfall is that the final quality of the hard-copy image depends in turn on the quality of the picture or image on the CRT. Another shortfall of these CRT based hard-copy image formation methods is the large number of additional circuit components needed to reduce the visual perception of laser scan lines in the CRT image in order to improve the overall quality of the final hard-copy image print.

SUMMARY OF THE INVENTION

Accordingly, it is the primary object of this invention to provide a new and improved apparatus and method for making a hard-copy image of an object using an electronic still camera or a video television camera, into which this apparatus may be incorporated.

Another object of this invention is to provide a camera imaging mechanism that, under control of the central processor and imaging system processor, uses focused light beams generated by a laser source such as a laser or a laser diode or a non-laser diode, to make a hard-copy image of an object onto photosensitive material.

Another object of this invention is to provide an apparatus that can also function as a video printer when desired.

Another object of this invention is to provide an apparatus that can take "still" or "motion" pictures in the manner of an electronic still camera or a video television (TV) camera respectively.

Another object of this invention is to provide an apparatus that is capable of exposing more than one photosensitive material frame with the one exact image, especially in those cases when specific positions or instances of a moving object need to be captured in hard-copy form.

Another object of this invention is to provide an apparatus and method that is capable of changing or adjusting the final hard-copy image by, for example, changing the color tone and the brightness of the hard-copy image.

With the above objects in mind, and such other objects in view as will hereafter more fully appear in the detailed description of the preferred embodiment and the accompanying drawings, this invention consists of the novel combinations and arrangements of parts and methods of generating a picture signal in formation, storing it, and then using this information to direct and control a light beam source and focusing mechanisms that expose the photosensitive material and makes an image of the object whose picture information was stored in memory.

It is, however, to be understood that variations and modifications may be resorted to which fall within the scope of this invention as claimed. Further, the parts of the apparatus which make up this invention may be only a part or section of the entire structure of, for example, an electronic still camera or a video camera, or even a video printer. When they are, then they may have more than one function, such as running or being connected to other parts of the camera.

DESCRIPTION OF THE DRAWINGS

The drawing in FIG. 1 is the block diagram showing the circuit of the invention, as light from the object being photographed enters the camera apparatus and onto the image sensor circuit component, Section 4.

The drawing in FIG. 2 shows the pairings done with the pixel resolutions of the image sensor and the pixel resolutions of the photosensitive material. For example, Pixel 26 of FIG. 2A, which is in row ten and column three of the image sensor, is mapped to Pixel Section 28 of FIG. 2B of the photographic film which is also in row ten and column three.

Figure 1:
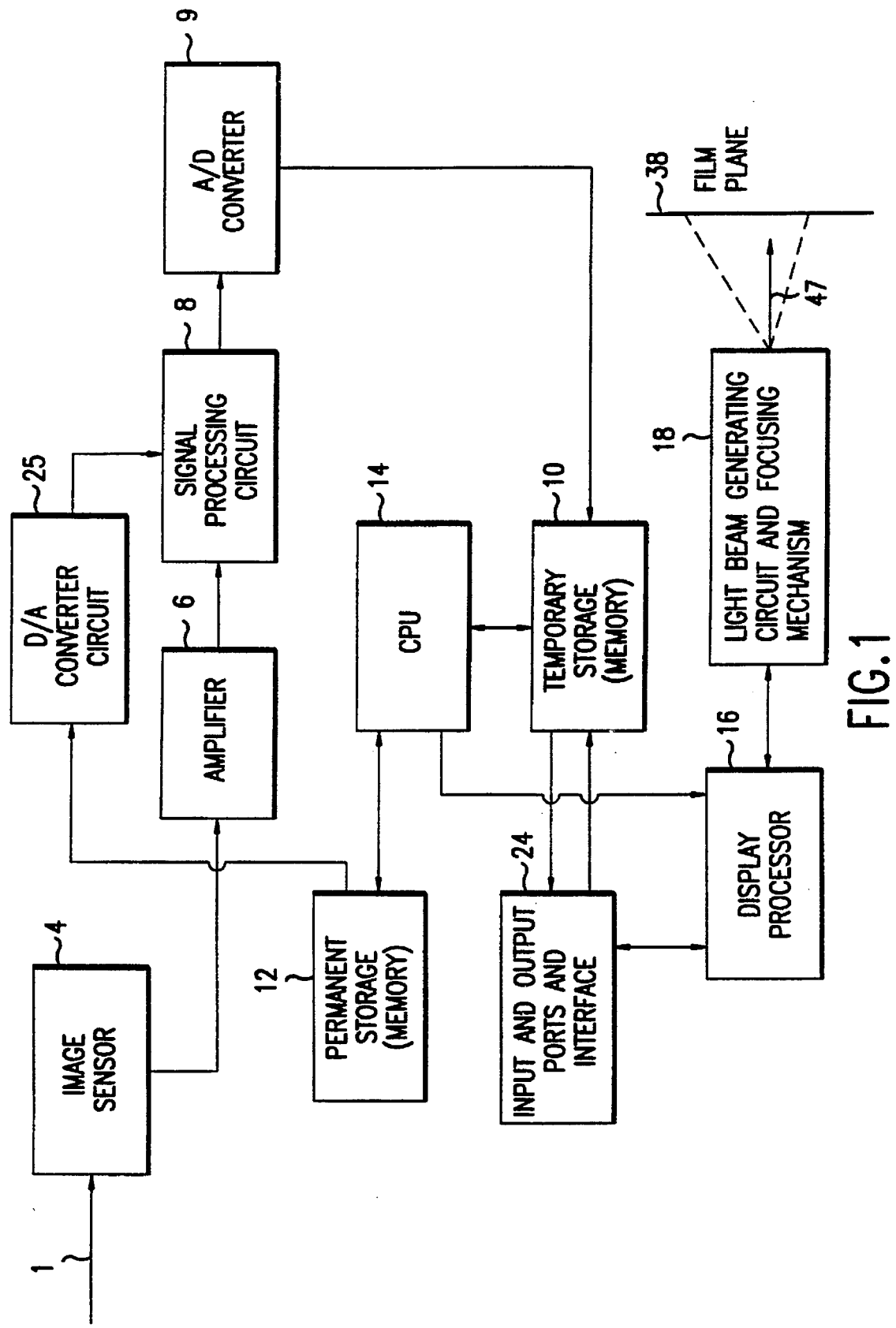
Figure 3:
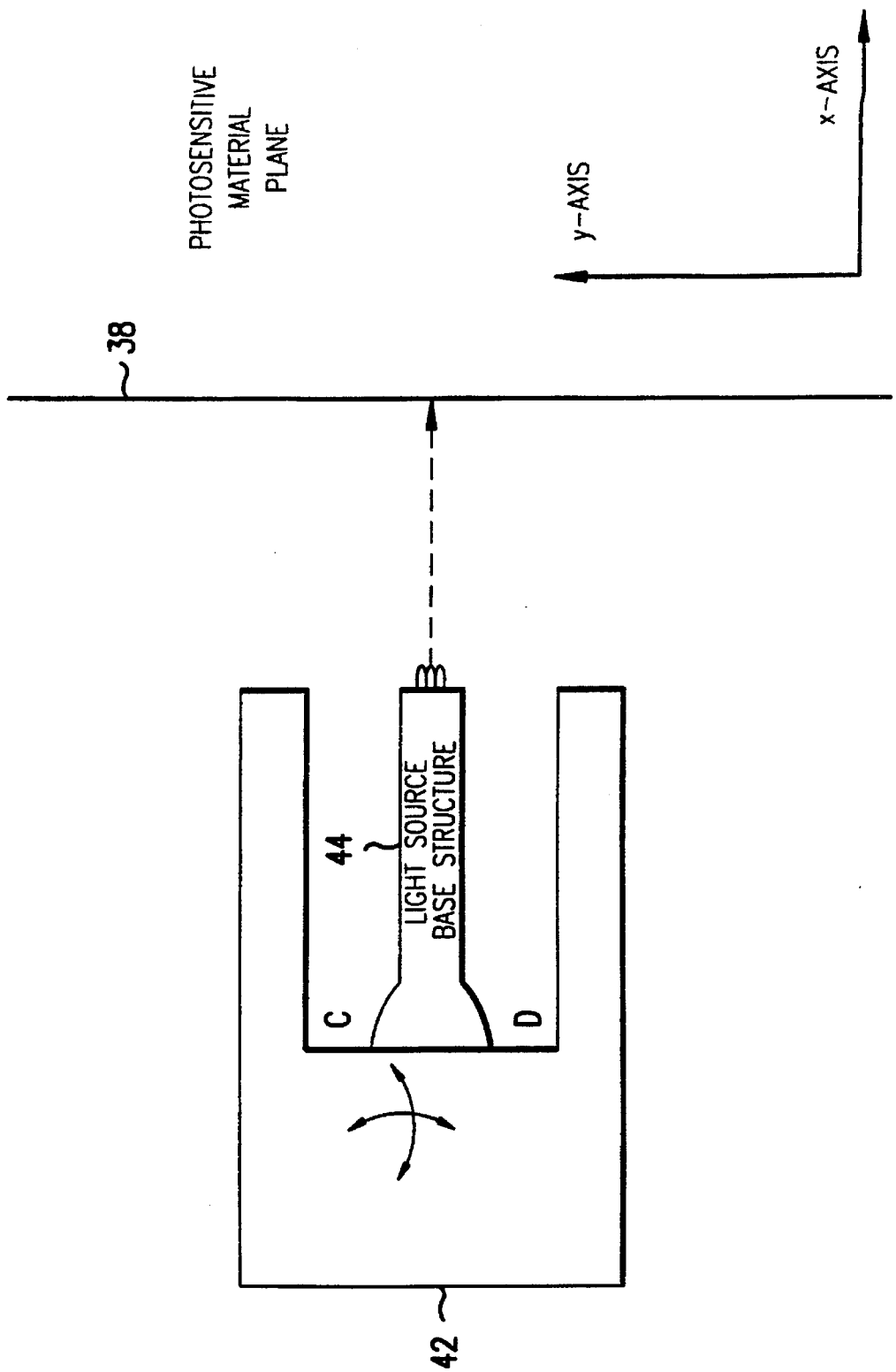
Figure 4:
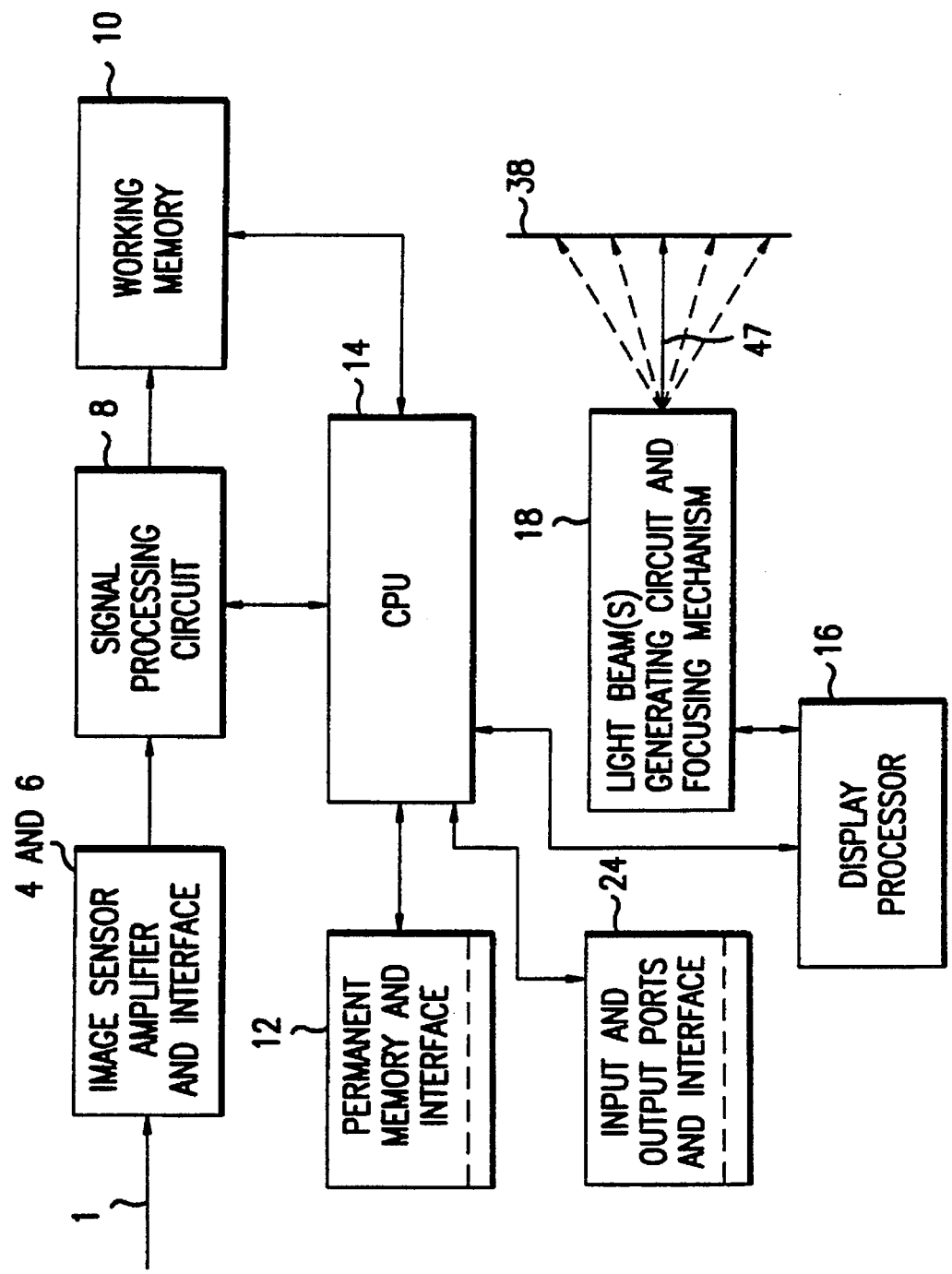

The drawing in FIG. 3 is the expanded component, Section 18 of FIG. 1. In this drawing, an array of individual sharp and focusing light sources, such as lasers or laser diodes that can be activated individually or in multitudes is used. The light from each of the light sources in this array has a different color. Furthermore, the support base structure into which the light source array is built is of appropriate weight or made of magnetic material so that it can be deflected by either an applied electric field or magnetic field respectively. In deflecting the base structure into which the light source array is built, the beam(s) of light that are activated at a given time are also deflected likewise along the x-axis and the y-axis in the photosensitive material plane onto which the hard-copy image is being made. The drawing in FIG. 4 is a slight modification in the type of image sensor and signal processor circuits (both digital) used. they, however, fall within the scope of the invention.

DETAILED DESCRIPTION OF THE PREFERRED EMBODIMENT

Referring to FIG. 1, a light beam which may be the main light beam from the object or a split part of the beam which is split by a half reflecting mirror (not shown), enters the image sensor which may be a CCD, which is Section 4. The image sensor is responsible for the picture equality since its pixel count per given square area determines how much information about the object being photographed is passed on to the image.

The image sensor converts the light information of the object into a corresponding electrical signal. The electrical signal is weak and is amplified by amplifier Section 8 of FIG. 1. The signal from the amplifier moves into Section 8, FIG. 1, which is a signal processing circuit. Here the circuit of FIG. 1, Section 8 carries out gamma correction and adjusts the signal characteristics due to the image sensor to conform to the gamma characteristics of the photosensitive material onto which the hard-copy image will be made in one form, or onto which the soft-copy will be made in another form. Section 8 of FIG. 1 may also make adjustments in color and separate the signal into luminance and chrominance signal components.

The output of Section 8 is passed through an A/D converter, Section 9 of FIG. 1. From the A/D converter, the digitized signal is stored into temporary memory storage circuits, Section 10 of FIG. 1. All the above activities are controlled by the CPU, Section 14, which is also used to control the timing and functions of other camera parts which are not part of the invention, but which make up the entire camera into which this invention apparatus is incorporated.

Image information already stored in permanent memory circuits, Section 12 of FIG. 1, that needs to be made into hard-copy form, is retrieved from therein, and passed through D/A circuit, Section 25 and the analog signal is fed to Section 8, FIG. 1. If changes are needed to be made on this image, the information to effect this change, in the form of instructions regarding the desired change, such as modifications in shape, changes in color and brightness, is input through the invention's system through Section 24, FIG. 1, which is the input and output interface ports. This Section 24 of FIG. 1 preferably includes a miniature keyboard for inputting information and output ports for displaying image information on a television screen that may or may not be part of the entire camera into which this invention is incorporated.

The modification mentioned in the prece3ding paragraph above include recreation of a new image frame from stored picture information and recently input instruction into the camera apparatus.

With regard to recreation of a new image from stored picture information and recently input instructions into the camera apparatus, the stored picture frame information is retrieved from memory storage. Section 10 of FIG. 1 and passed through the D/A Section 25 where it is converted from digital from to analog form. Then the signal processing circuit, Section 8 of FIG. 1, receives the signal and carries out the necessary changes.

Information for image recreaction that is stored in this camera apparatus may be information of picture frames that the user of the camera and other devices in which this apparatus is embodied, normally uses. For example, if such a camera is being used by law enforcement agencies, the information may be that of people's faces, which the camera apparatus will use to recreate new people'faces.

Under the direction of the CPU, the image information now in temporary memory storage circuits, Section 10 of FIG. 1, is fed to the display processor, Section 16 of FIG. 1. The display processor, Section 16, then in turn controls and directs the light beam generating and focusing circuits, which is Section 18 of FIG. 1.

Using the preferred embodiment illustrated in FIG. 3, the display processor of FIG. 1, Section 16, in turn, from the information given to it by the CPU, Section 14 of FIG. 1, instructs the light beam generating and focusing mechanism, which is Section 42 of FIG. 3, to build up a variable electric or magnetic field in the space marked C and D in FIG. 3. This variable electric or magnetic field that varies according to the information sent to the focusing (imaging mechanism), Section 42 of FIG. 3, is then used to focus or deflect the charged or magnetic material (one that can be attracted or repelled by a magnetic field depending on its polarity) light source support structure, which is Section 44 of FIG. 3.

In so doing, the electric or magnetic field also deflects the required light beam(s) coming out of the array of light sources so that they focus only on the required pixels on the photosensitive materials Section 38 of FIG. 3. The array of light sources is composed of one or more sharp light beams that can be switched on individually or in multitudes as the situation may demand. Also the light beam from each individual light source has a different color (wave length) or a combination of colors from the rest, within the visible part of the electromagnetic spectrum.

Specifically, the display processor controls the deflection of these light beams. It also decides when and what light beams should be switched on.

An example is given for simplification purposes: Variable one, denoted by the letter V, specifies the number of beams to be switched on. Variable W specifies the color of each beam to be switched on. Variable three, denoted by the letter X, specifies the position of the pixel along the x-axis in the photosensitive material plane where each beam is to be focused. Variable four, denoted by the letter Y, specifies the position of the pixel along the Y-axis in the photosensitive material plane where the beam is to be focused. If the red, green, and blue beams are to be focused onto pixel points on the photosensitive material $(X_1, Y_1)$, $(X_2, Y_2)$, $(X_3, Y_3)$ respectively, then the commands may be represented as follows:

$(V_1, W_R) (X_1, Y_1)$ $(V_1, W_G) (X_2, Y_2)$ $(V_1, W_B) (X_3, Y_3)$ where:

$W_R$=Red light beam $W_G$=Green light beam $W_B$=Blue light beam

Alternatively, another variation in the commands given by the display processor may be to specify pixel point G on the photosensitive material, as the current position of a particular beam of light, and then specify its destination, pixel point H, in terms of X and Y. Then with pixel point G as the starting point of the beam, it is only necessary to specify X and Y to get to point H. These are the coordinates of Vector GH through which the beam is to be moved. Of importance too is the information about variable V and W regarding the beam(s) that has to be provided as the beam moves along the vector or Contour GH.

Preferably, a filter should be placed in front of the photosensitive material. This filter should have a hole or holes through which the light beam has to pass to expose the desired pixel(s) on the photosensitive material, while blocking or stopping the same light beam(s) from exposing other pixel points within the vicinity of the desired pixel(s). In addition, the position of the filter should be adjustable or movable in order to allow the correct positioning of the outlet hole through which the light beam(s) pass in order to expose the photosensitive material.

Figure 2B:
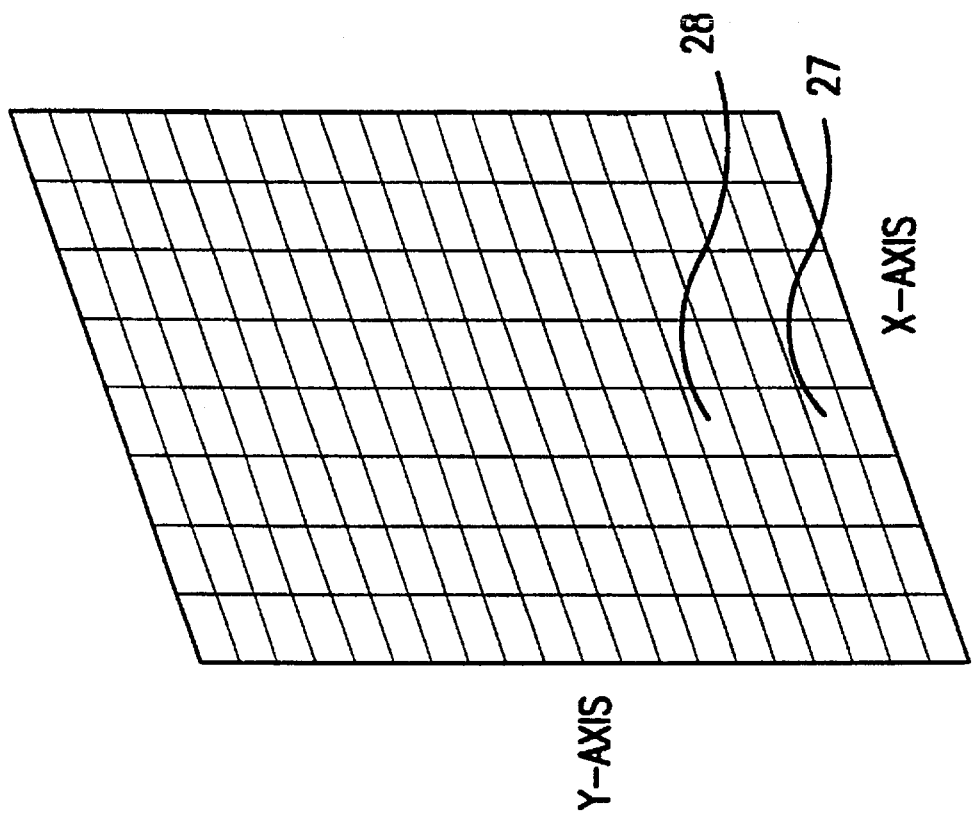
Figure 2A:
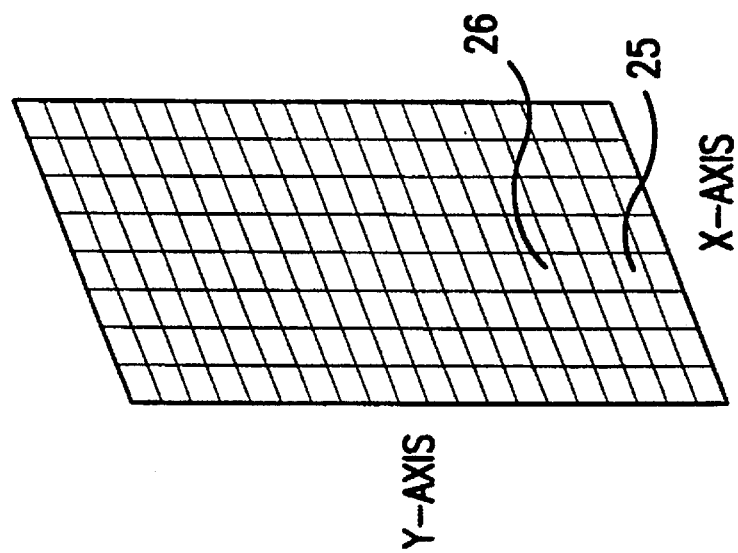

The present invention described with reference to the particular embodiment above and illustrated in the drawings of FIG. 1 through FIG. 3, may have other embodiments that those skilled in the art can easily make without deviating from its primary scope. For example, a digital image sensor may be used instead of the analog image sensor 4, in FIG. 1. For such a case, the signal processor and the amplifier 6 are also digital so that the D/A 25 and A/D 9 are removed from the circuit of FIG. 1, so that FIG. 1 looks like the circuit shown in FIG. 4. Slight variations in the light beam(s) generating circuit and focusing mechanism 8 of FIG. 1 are also possible. All modifications and variations in the components used should, however, fall within the improved usage limits afforded by the invention as illustrated in FIG. 1 and described fully in the detailed specifications. The scope of this invention should therefore be determined, not only by the embodiment described, but by the appended claims.

What I claim is:

1. An improved camera method for recreating a composite image frame in both a soft-copy form on a visual display screen of a camera and a hard-copy form on a photosensitive material means of said camera, using more than one pure, non-distorted and noise free image frame signal comprising the steps of:

(a) providing to a temporary memory means of said camera and to said visual display screen means of said camera, a first pure, non-distorted and noise free image frame;

(b) using a keyboard input means of said camera and said visual display screen means of said camera to divide said first pure, non-distorted and noise free image frame provided to said temporary memory means of said camera and to said visual display screen means of said camera, using a predetermined space coordinate system displayed on said visual display screen means of said camera, into a distinct number of equal parts in area so that each part so divided is of a predetermined size in area, said predetermined size in area being larger than a normal pixel size of an image sensor circuit means of said camera;

(c) using said keyboard input means of said camera and said visual display screen means of said camera to number or label each of said distinct number of parts of said first pure, non-distorted and noise free image frame parts, so that each of said distinct number of parts of said first pure, non-distorted and noise free image frame is identified by a unique number or a unique label;

(d) looking at said visual display screen means of said camera and making a user or an operator choice-based visual determination which of said distinct number of parts of said first pure, non-distorted and noise free image frame parts are to be erased;

(e) using said keyboard input means of said camera to identify to said camera said distinct number of parts of said first pure, non-distorted and noise free image frame parts visually predetermined for erasure, by inputting into said camera said unique number or said unique label allocated to each of said distinct number of parts of said first pure, non-distorted and noise-free image frame parts visually predetermined for erasure;

(f) providing to said temporary memory means of said camera and to send visual display screen means of said camera a corresponding second pure, non-distorted and noise-free image frame part for every part of said first pure, non-distorted and noise-free image frame visually predetermined for erasure and pre-identified to said camera;

(g) using a signal processing circuit means of said camera, a central processor unit means of said camera, said keyboard input means of said camera and said visual display screen means of said camera to erase every said part of said first pure, non-distorted and noise-free image frame visually predetermined for erasure and pre-identified to said camera and filling every resulting blank part of said first pure, non-distorted and noise-free image frame with said corresponding second pure, non-distorted and noise-free image frame part so as to produce a third pure, non-distorted and noise-free recreated composite image frame;

(h) using said keyboard input means of said camera to instruct a display processor means of said camera and said central processor unit means of said camera to use the image information contained in said third pure, non-distorted and noise-free recreated composite image frame to direct and control a light beam generating and focusing circuit means of said camera to expose said photosensitive material means with said third pure, non-distorted and noise-free recreated composite image frame.

2. The method of claim 1 whereby if said camera user or said camera operator choice-based visual determination results into no requirement for erasing of any said distinct number of parts of said first pure, non-distorted and noise-free image frame, then said corresponding second pure, non-distorted and noise free image frame parts are not provided to said temporary memory means of said camera and said visual display screen of said camera.

* * * * *